US011922694B2

(12) United States Patent
Carter et al.

(10) Patent No.: US 11,922,694 B2
(45) Date of Patent: *Mar. 5, 2024

(54) SYSTEMS AND METHODS FOR AUGMENTED REALITY APPLICATION FOR ANNOTATIONS AND ADDING INTERFACES TO CONTROL PANELS AND SCREENS

(71) Applicant: FUJIFILM Business Innovation Corp., Tokyo (JP)

(72) Inventors: Scott Carter, Menlo Park, CA (US); Laurent Denoue, Verona (IT)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,497

(22) Filed: Oct. 17, 2022

(65) Prior Publication Data

US 2023/0139977 A1      May 4, 2023

Related U.S. Application Data

(63) Continuation of application No. 16/786,827, filed on Feb. 10, 2020, now Pat. No. 11,475,661.

(51) Int. Cl.
| | |
|---|---|
| G06V 20/20 | (2022.01) |
| G06F 3/01 | (2006.01) |
| G06T 7/73 | (2017.01) |
| G06T 15/20 | (2011.01) |
| G06T 19/00 | (2011.01) |
| G06V 20/62 | (2022.01) |

(52) U.S. Cl.
CPC .............. *G06V 20/20* (2022.01); *G06F 3/011* (2013.01); *G06F 3/017* (2013.01); *G06T 7/74* (2017.01); *G06T 15/205* (2013.01); *G06T 19/006* (2013.01); *G06V 20/635* (2022.01)

(58) Field of Classification Search
None
See application file for complete search history.

(56) References Cited

U.S. PATENT DOCUMENTS

| | | | |
|---|---|---|---|
| 2014/0064566 A1 | 3/2014 | Shreve et al. | |
| 2014/0184644 A1 | 7/2014 | Sharma et al. | |
| 2017/0262967 A1 | 9/2017 | Russell | |
| 2018/0047192 A1* | 2/2018 | Kristal | ............... G06Q 30/0643 |
| 2018/0290057 A1 | 10/2018 | Mullins | |
| 2019/0205078 A1* | 7/2019 | Sueki | ...................... A63F 13/52 |
| 2020/0074692 A1* | 3/2020 | Ooba | .................. G06F 3/04847 |
| 2021/0090209 A1 | 3/2021 | Appleboim et al. | |

* cited by examiner

*Primary Examiner* — Tapas Mazumder
(74) *Attorney, Agent, or Firm* — Procopio, Cory, Hargreaves & Savitch LLP

(57) ABSTRACT

Example implementations described herein systems and method for providing a platform to facilitate augmented reality (AR) overlays, which can involve stabilizing video received from a first device for display on a second device and for input made to a portion of the stabilized video at the second device, generating an AR overlay on a display of the first device corresponding to the portion of the stabilized video.

21 Claims, 8 Drawing Sheets

SYSTEMS AND METHODS FOR AUGMENTED REALITY APPLICATION FOR ANNOTATIONS AND ADDING INTERFACES TO CONTROL PANELS AND SCREENS

CROSS-REFERENCE TO RELATED APPLICATIONS

This application is continuation of U.S. Ser. No. 16/786,827 filed Feb. 10, 2020, the contents of which are incorporated herein by reference.

BACKGROUND

Field

The present disclosure is generally related to Augmented Reality (AR) systems, and more specifically, for generating usable control panel and screen interfaces with AR.

Related Art

In the related art implementations, there are AR applications that provide interfaces so that users can operate dashboards or stereo systems in a vehicle. In other applications, internet browsing sessions can leverage AR to add overlays to web pages, which assists people in navigating the internet.

SUMMARY

Example implementations described herein are directed to AR implementations that allows for streaming a rectified view of a display (e.g., computer screen, touch Liquid Crystal Display (LCD), digital control panel, control panel of an appliance) and where a live or automatic agent adds overlays to guide a person through a process (e.g., what button to click or tap on a screen, where to enter text, etc.). Example implementations involve a registration: detecting the boundary of the object of interest in order to properly display the AR overlays on the screen even when the user moves the camera. In another example implementation, the creation of marks is conducted based on the underlying content and can be automatically removed as actions are taken. In another example implementation, there is the automatic detection of occlusions to display instruction overlays underneath in a realistic manner. Finally, an automatic process allows ingesting existing video material to extract anchor images to be used to initialize the registration steps, (e.g. a how-to video of an LCD display on an appliance such as a multi-function device (MFD)).

In example implementations, the AR interfaces can be extended to a live remote assistance task, in which remote experts connect with people who share a live stream from a mobile or head-worn device to diagnose and fix problems in the field. With the uptake of live streaming services, live remote assistance is becoming a way for users to troubleshoot problems of increasing difficulty. Related art tools focus on allowing the remote user to annotate or demonstrate a solution, but do not take into consideration the need from users to spend time and effort in following their instructions. Users will often need instructions repeated before they can fully understand them, and in some cases they will need to use both hands to manipulate a physical device, making it difficult to also stream live video from a mobile. To address these issues, example implementations facilitate an AR based tool for remote assistance interfaces that can automatically record steps during a live stream that a user can view asynchronously.

Aspects of the present disclosure involve a method, which can include stabilizing video received from a first device for display on a second device; and for input made to a portion of the stabilized video at the second device, generating an augmented reality (AR) overlay on a display of the first device corresponding to the portion of the stabilized video.

Aspects of the present disclosure involve a non-transitory computer readable medium, storing instructions for executing a process, the instructions including stabilizing video received from a first device for display on a second device; and for input made to a portion of the stabilized video at the second device, generating an augmented reality (AR) overlay on a display of the first device corresponding to the portion of the stabilized video.

Aspects of the present disclosure involve a system including means for stabilizing video received from a first device for display on a second device; and for input made to a portion of the stabilized video at the second device, means for generating an augmented reality (AR) overlay on a display of the first device corresponding to the portion of the stabilized video.

DETAILED DESCRIPTION

Figure 1:
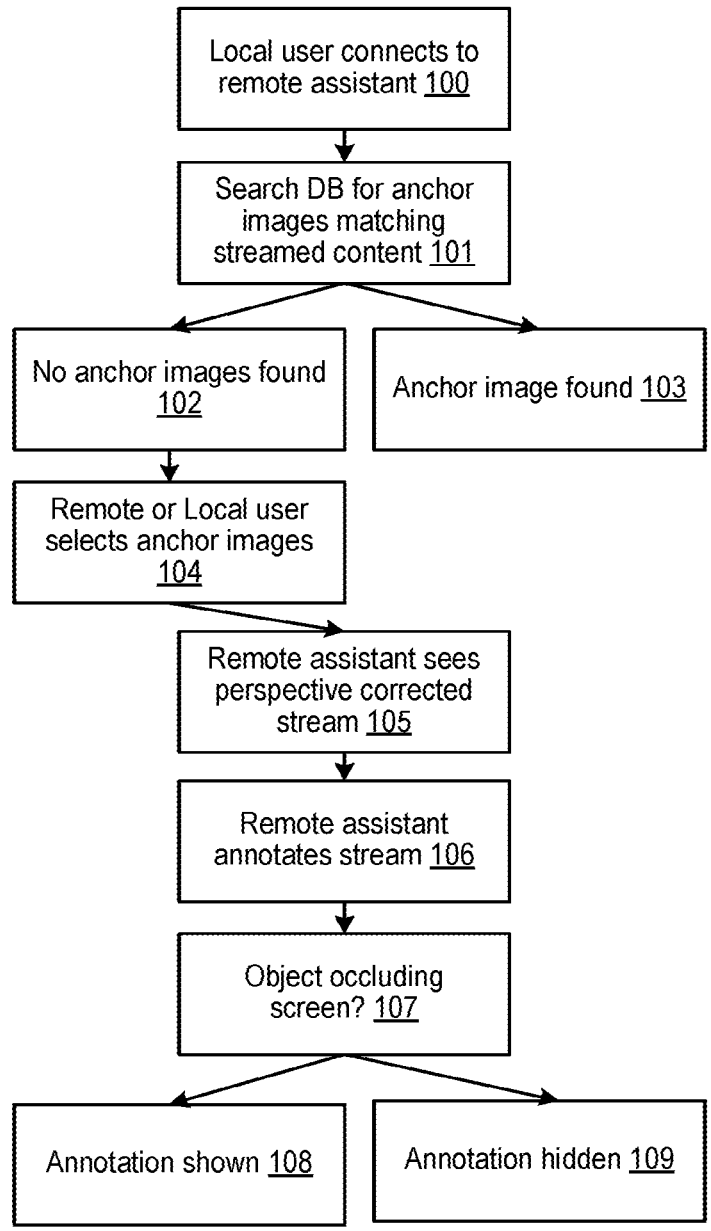
FIG. 1 illustrates an example flow for overlaying an AR interface and/or annotations on a screen or control panel, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Remotely helping customers troubleshoot advanced appliances such as MFDs can involve several challenges. For example, voice-only interaction can be error prone, and dispatching a service engineer to the customer site can be long and costly.

To address such situations, many appliance manufacturers author how-to videos. When videos are not enough, customers will still need live help from a service engineer. In example implementations, there is an AR system that is configured to provide AR overlays on screens and control panels, such as the computer/smartphone screen of the customer when they install a driver for a new MFD, or the LCD screen of the MFD when the operation deals with touching buttons to configure the MFD. In particular, example implementations take advantage of the surfaces of screens and control panels, which are 2D surfaces in nature, to provide annotations and better overlays than related art implementations.

In related art implementations, customers install a screen sharing software that allows the remote engineer to view the customer screen, and either take control of the customer screen, or move the remote cursor to guide the customer. Further, oftentimes the users can only resort to video, i.e., through taking an image the LCD or control panel with a smart phone and letting the remote engineer see what the customer sees.

In such related art implementations, installing a screen-sharing software on a personal computer is problematic: the customer is already seeking help to install another software, their company might not easily allow installation of new software, the computer might not be connected to the internet, or there may not be a screen-sharing application for the mobile device.

Further, with a video stream, the remote engineer can become disoriented as users move the phone around, and communication can be greatly impaired by being limited to verbal instructions (e.g. "yes click this red button on the bottom left, no not this one, that one, then press all these buttons together and hold for 3 seconds")

To address such issues, example implementations facilitate an AR interface and overlay system that addresses control panels and screens (e.g., computer screens, touch screens, regular digital control panels seen on MFDs, or appliances such as microwaves, car stereo systems, etc.). With only a mobile device utilizing the AR interface of the example implementations described herein, users can direct the mobile device camera to their screen/LCD/panel, allowing the remote engineer to interactively add overlay instructions to guide them.

FIG. 1 illustrates an example flow for overlaying an AR interface and/or annotations on a screen or control panel, in accordance with an example implementation. The flow begins when the local user connects to the remote assistance system through their user device at 100.

In example implementations, the system conducts image tracking as the basis for detection and tracking of the screen or control panel. At 101, the system searches the database for anchor images matching the streamed content. Depending on the desired implementation, the database of anchor images representing objects to detect can be automatically or manually populated. Anchor images are images processed to extract key-points.

For the static case in which the screen or LCD display comes from a known device (e.g. LCD panel of a known MfD), the reference images are pre-populated in the application, or pulled from on online database and downloaded to the application. For example, for MfDs, there exists a set of images showing the LCD control panel of a particular MfD device, allowing the application to automatically detect and track these kinds of control panels as soon as they appear in the field of view of the camera. Similarly, a set of images can be made for popular standard laptop models. Thus if an anchor image is found within the application or can be pulled from the online database, such an anchor image is used at 103.

If no anchor images are found 102, then the application also supports dynamic registration of never-seen objects or LCD displays, in which case a quadrangle detector can be used along with the AR plane detector. Specifically, when the service engineer or local user taps the screen, the application can be configured to execute a rectangle or quadrangle detector on the current frame and tests the projection of the four corners in 3D space for intersection with a known AR plane. A 3D plane matching the 2D points of the rectangle is then created and tracked in 3D space by the AR framework, whereupon the anchor images are thereby selected at 104.

Once these reference images are established, the video frames captured by the application are perspective corrected for the remote engineer to see a stable version of the region, allowing creation of Augmented Reality Overlays (AROs) at 105. The remote assistant can then provide annotations on the stream at 106, whereupon the application system determines if there are objects occluding the screen or not at 107. If they are, then annotations are hidden at 109, otherwise they are shown at 108.

Once the application detects and tracks an anchor, the remote engineer can create overlays by clicking on the screen. The marks are sent to the application and displayed in AR at the corresponding location. In an example implementation, the tracked 3D rectangle uses a WebView as a texture, and the marks created by the remote engineer are recreated in Hyper Text Markup Language (HTML), allowing matching between what both users see.

Depending on the desired implementation, to enhance the AR experience, the overlaid marks can be masked in order to appear above the display surface. Such example implementations can be helpful when the device is a touch panel (either digital touch screen or physical buttons) where the customer obfuscates some parts of the display surface during interactions.

In example implementations, the application can facilitate dynamic overlays which allow a service engineer to create overlays containing more than one step (e.g., "fill this text box here and then click OK button"). In that case, the service engineer clicks/taps on the text box, then move to the OK button and click/tap it. Only then are the overlays sent to the customer as an animation of things to perform, showing the motion from the current customer's position to the text box (arc for example followed by the text box's contour being highlighted), then another arc hoping from the text box to the OK button. The steps can be numbered to make the order of actions to follow more obvious, and let the customer replay the steps to do (which would be impossible if the overlays and mouse positions had been transferred in real-time).

Unlike traditional screen-sharing, dynamic overlays can be useful to the end user because the user might not always be able to follow the whole sequence with the display always in view. The user might want to first see a sequence in AR, then attend to the actual display and perform the steps.

Furthermore, some steps can require pushing and holding several buttons, which again may not be easily conveyed using real-time overlays. With dynamic overlays as described herein, the service engineer can comfortably create a series of steps and send them to the remote customer after they have been correctly created. This asynchronous within an otherwise synchronous video collaboration is analogous to what users can do in a text-based chat system: write and editing text messages without committing before pressing "Send".

In example implementations, various types of overlays can be utilized. For example, some actions require dragging a finger or mouse pointer over a path, while others signify only moving the finger/mouse to another location. Several types of overlays can depict these differences, such as a light arrow versus a bold arrow for example. Depending on the desired implementation, the overlays can be augmented by text tooltips.

Example implementations can also facilitate current mouse/cursor position detection. Like a person teaching a child by holding her hand, the AR overlays can consider the current finder/cursor position and show users where they need to go next. For example, during a software installation process, it might not be clear where the person's cursor needs to be located: some UI elements require clicking inside a text box first. If the service engineer defines a click inside an area but the user cursor is out of the area, the application can automatically display an arc from the current user mouse position to the text box location, making it clear that the cursor first needs to move there.

Example implementations can also facilitate automatic overlays. In example implementations, steps received during a live session can be recorded and played back later. For example, instead of calling the service engineer repeatedly, the application can automatically suggest to playback previously recorded overlays if it detects that the object being videoed contains the same anchor images. This feature allows customers to operate the device on their own without requiring live communication with a service engineer.

Example implementations can also check to determine if an action was performed. In some scenarios, buttons may need to be pressed for several seconds. When the engineer creates an overlay, he does not need to press for the required time (e.g. 10 seconds) on an area but can specify the duration. However, the user must press and hold that button for the specified duration. Besides showing the duration in a tooltip, example implementations can also facilitate counting for how long the cursor/fingertip was help at the designated location.

Figure 2:
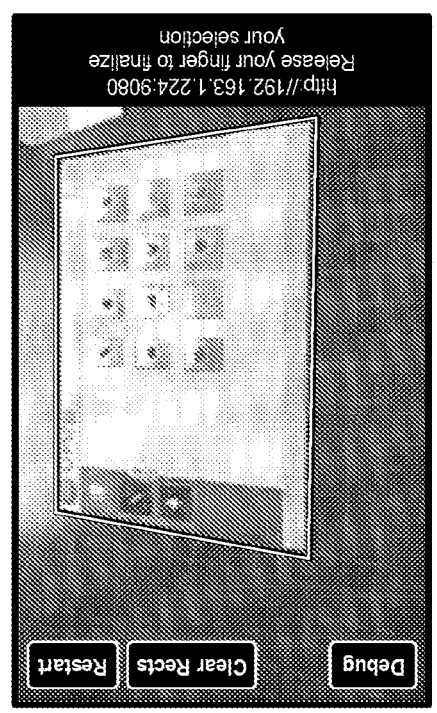
FIG. 2 illustrates an example overlay on a device panel as captured from a user device, in accordance with an example implementation.
Figure 3:
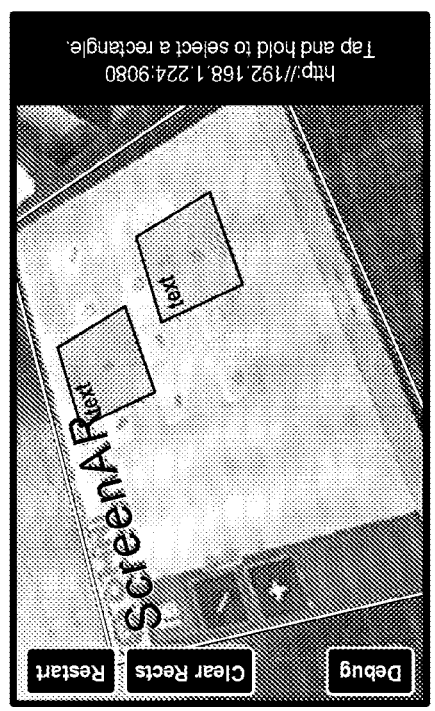
FIG. 3 illustrates an example of 3D overlay nodes with transitions, in accordance with an example implementation.

FIG. 2 illustrates an example overlay on a device panel as captured from a user device, in accordance with an example implementation. As illustrated in FIG. 2, real-time quadrangle detection is utilized to track the control panel captured by the user device. 3D overlay nodes can be generated and applied using a framework in accordance with an example implementation, and texturing plane nodes can be utilized with arbitrary views. FIG. 3 illustrates an example of 3D overlay nodes with transitions, in accordance with an example implementation.

Figure 4:
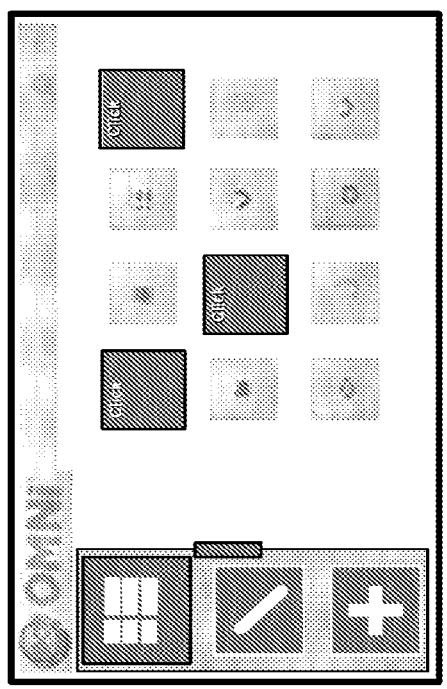
FIG. 4 illustrates a perspective corrected panel, in accordance with an example implementation.

For network communication, the user device can act as a web server and websocket server through using the appropriate library. The frames captured by the application are sent as images to the remote engineer, and the marks created are sent back to the application and recreated in the webview used as a texture. For two-way audio, a WebRTC-based solution can be utilized between a web browser and the application. Once the 3D plane is fitted and subsequently tracked by the AR framework, the frames are perspective corrected and sent to the remote engineer. FIG. 4 illustrates a perspective corrected panel, in accordance with an example implementation. With perspective correction, the remote engineer sees the cropped and rectified live camera view of the display as captured by the end user in the application. The remote engineer can create arbitrary overlays.

Figure 5:
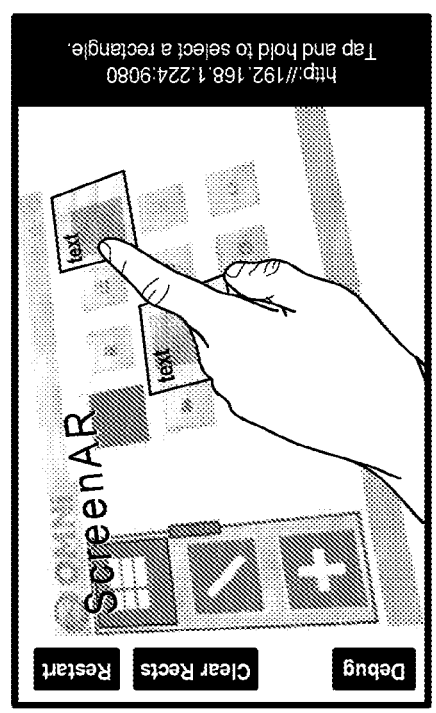
FIG. 5 illustrates an example of the overlay in which the hand and finger masks are implemented so that overlays are placed underneath the hand or finger.

Through the example implementations, there can be an AR system that overlays AR interfaces specifically over 2D surfaces in a live scenario, and in particular, occluding the hands and detecting mouse/finger positions to create overlays that help guide a user. FIG. 5 illustrates an example of the overlay in which the hand and finger masks are implemented so that overlays are placed underneath the hand or finger. Depending on the desired implementation, hand and finger masks can also be implemented to track the hand so that the overlays can be placed underneath the hand or finger. Such masks can be obtained through a segmentation network or through using a hand tracking model that tracks the hand or finger in real time. Thus, if there are objects occluding the screen at 107 of FIG. 1, the added annotations can be hidden at 109.

In another example implementation, the AR remote assistance system can also generate viewing steps for the system. Having a shared visual representation of a work environment can be useful for addressing many problems in the field. Incremental directions from the expert require the users to complete a task, sometimes a difficult one. During this period, the user either must put down their device or ignore its visual input. Furthermore, the user may forget the exact details of how to execute a particular step, requiring the remote expert to repeat their instructions.

Figure 6:
FIG. 6 illustrates an example of record and replay for the AR interface, in accordance with an example implementation.
Figure 6:
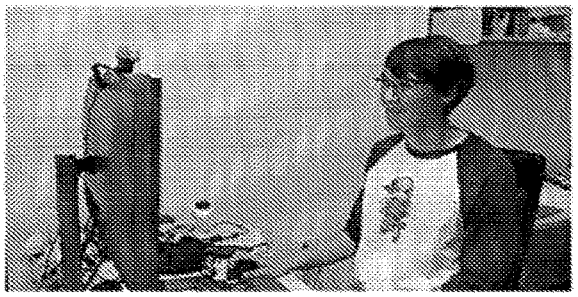
Figure 6:
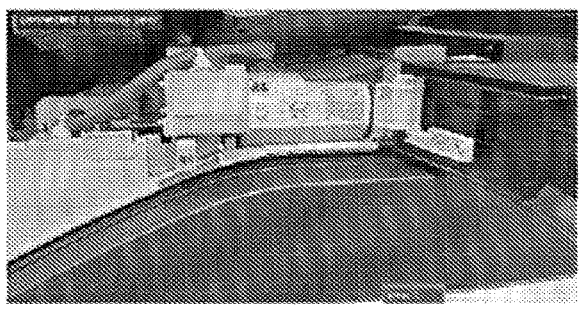
Figure 6:
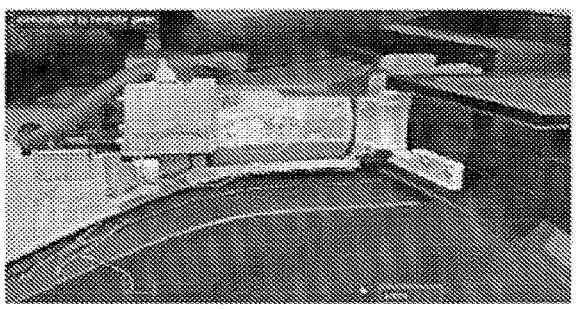
Figure 6:
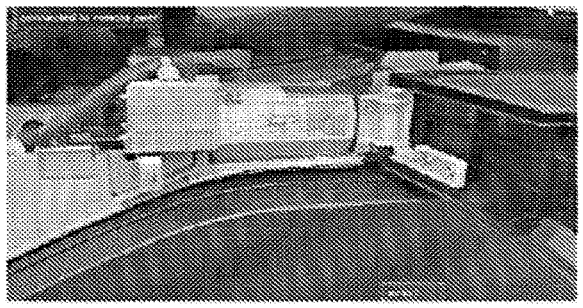
Figure 6:
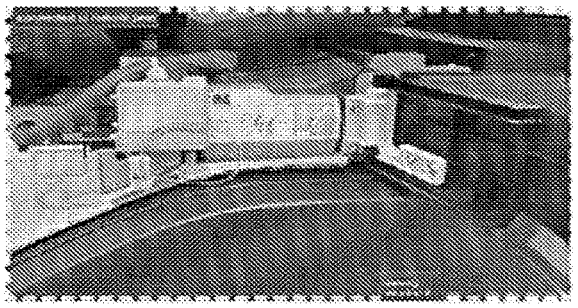

To address such issues, example implementations can augment the AR interface to facilitate the functionality of asynchronous tutorial step creation with live remote assistance. FIG. 6 illustrates an example of record and replay for the AR interface, in accordance with an example implementation. In example implementations, instructions from the remote expert are automatically or manually saved as their own video clip during the live video call. Then, when the local user needs to complete that step, they can view saved video clips in a separate video player to complete the task. While they complete their task, the remote expert can see a live view of the recording they are viewing in a sub-window. The local user can switch back to the live camera view at any time.

In example implementations, video clip steps are produced automatically whenever the remote expert is actively using their keyboard, mouse, or other peripheral device. The remote expert can also create steps manually.

Figure 7:
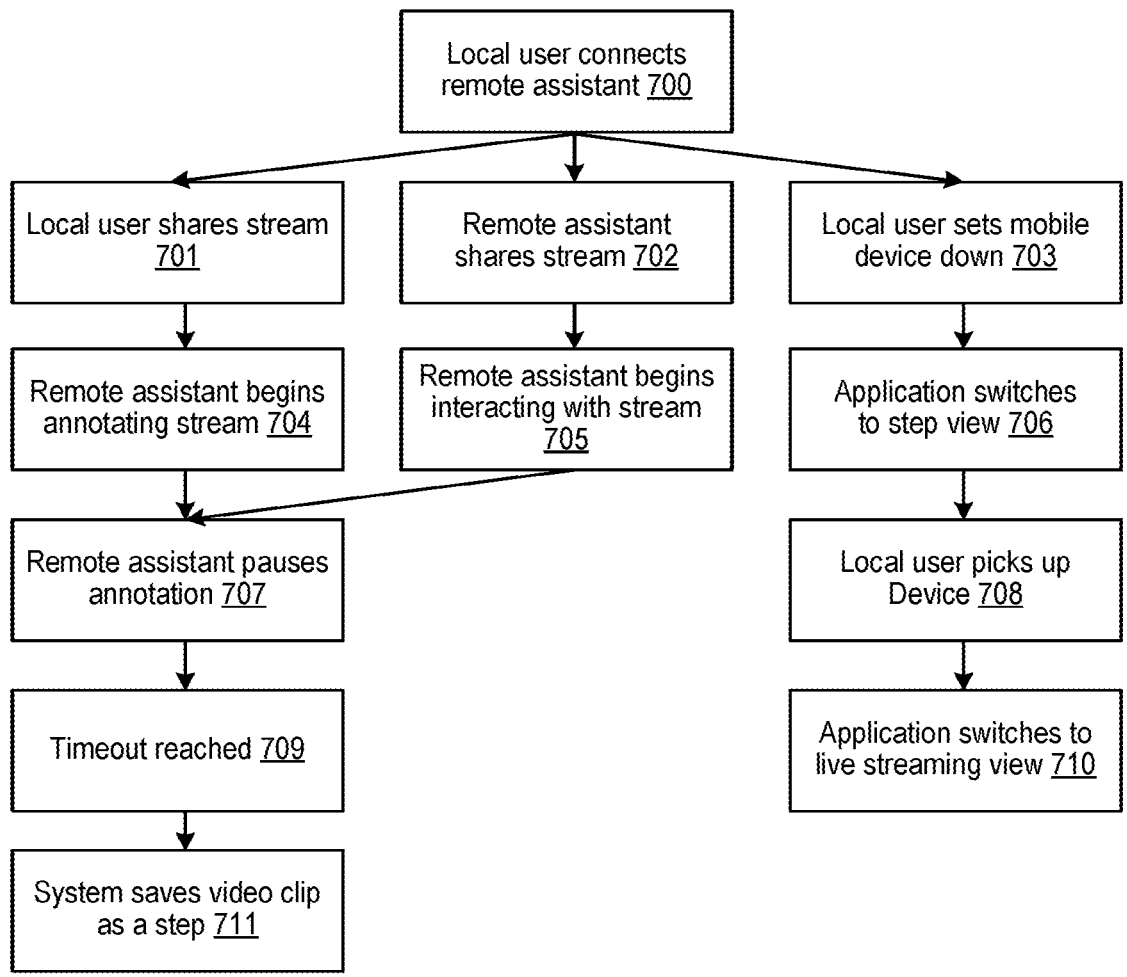
FIG. 7 illustrates a flow diagram for the annotation and recording process, in accordance with an example implementation.

FIG. 7 illustrates a flow diagram for the annotation and recording process, in accordance with an example implementation. At 700, the local user connects to the remote assistant. During the connection, several functions may be facilitated. The local user may share the stream with the remote assistant at 701. In such example implementations, the local user will be streaming content to the remote user from their mobile or heads-up device. In this case, once the remote expert begins annotating the user stream, a new clip recording is started automatically in the background while the live video session continues. The system records until the remote expert stops annotating the stream and a timeout is reached. The remote expert can optionally pause the user video to add more expressive annotations depending on the desired implementation. As illustrated in FIG. 7, the remote assistant may view the stream and add annotations as needed at 704. During the stream, the remote assistant may pause the annotation at 707. If the annotations are paused for a threshold period of time (e.g., several seconds), then a timeout is reached at 709. At that point, the system saves the video clip as a step 711.

In another example implementation, the remote assistant shares a stream to the local user at 702. Occasionally, for example when the local user is trying to solve an issue with a software system, the remote expert might share their own screen to show how a particular issue could be resolved in using their own software tools. In this case, the remote expert actively uses their own mouse and keyboard to demonstrate "steps" that the system can record, again using a timeout to determine the end of a step. The remote assistant begins interacting with the stream at 705 through providing annotations or controlling the interface or panels on their screen. The flow can continue along with the saving of video clips as illustrated at 707 onwards. In another example implementation, the remote expert can also click a button on their interface to produce a video clip manually. This is useful when the remote user wants to create a clip using their own video camera or load an external clip.

In another example implementation, the local user may set their user device down to perform the functions indicated by the remote assistant at 703. The placing the user device down can be detected based on an accelerometer, a gyroscope, or through other hardware of the device in accordance with the desired implementation. Even if the user is trying to hold a device still, a background process system can detect slight irregularities in accelerometer and gyroscope data to determine that the device is being held. Once the user sets the device down, however, the accelerometer and gyroscope data become static, allowing the background process to determine that the device is no longer in the user hands. In this way, the system can automatically switch between showing a view of the recorded steps (when the device is set down) and the live stream (when the device is in the user hands). At 706, once the device is detected to be placed down, the application switches to step view. The step view is maintained until the local user picks up the device at 708. Then the application switches back to live view at 710.

These approaches can be combined to help the local user complete a difficult task. For example, when interacting with a complicated interface, the remote expert can annotate the user live stream, creating one clip automatically. Then, while the user pauses to complete that task, the remote expert can annotate the same or similar interface on their own stream, creating another clip automatically. They could also manually load another clip from another user's recorded stream that handled the same issue.

Similarly, local users can take advantage of automatic or manual methods to switch between live video streaming and reviewing clips, in accordance with a desired implementation.

The system defaults to turning down the local user microphone when they are reviewing clips. It also defaults to showing the most recently recorded clips first. Furthermore, the user can use a standard vertical swipe interaction to move between different media clips and a horizontal swipe interaction to navigate within clips. In this way, the local user can seamlessly switch their device from live streaming to a lightweight tutorial review tool.

If the user is streaming from a heads-up display, then they can issue a verbal command to switch between live streaming and a review interface. On a mobile device, the user could switch interfaces with a verbal command or button press.

Through the example implementations described herein, a remote assistance system to automatically record steps during a live stream that a user can view asynchronously can be facilitated.

Figure 8:
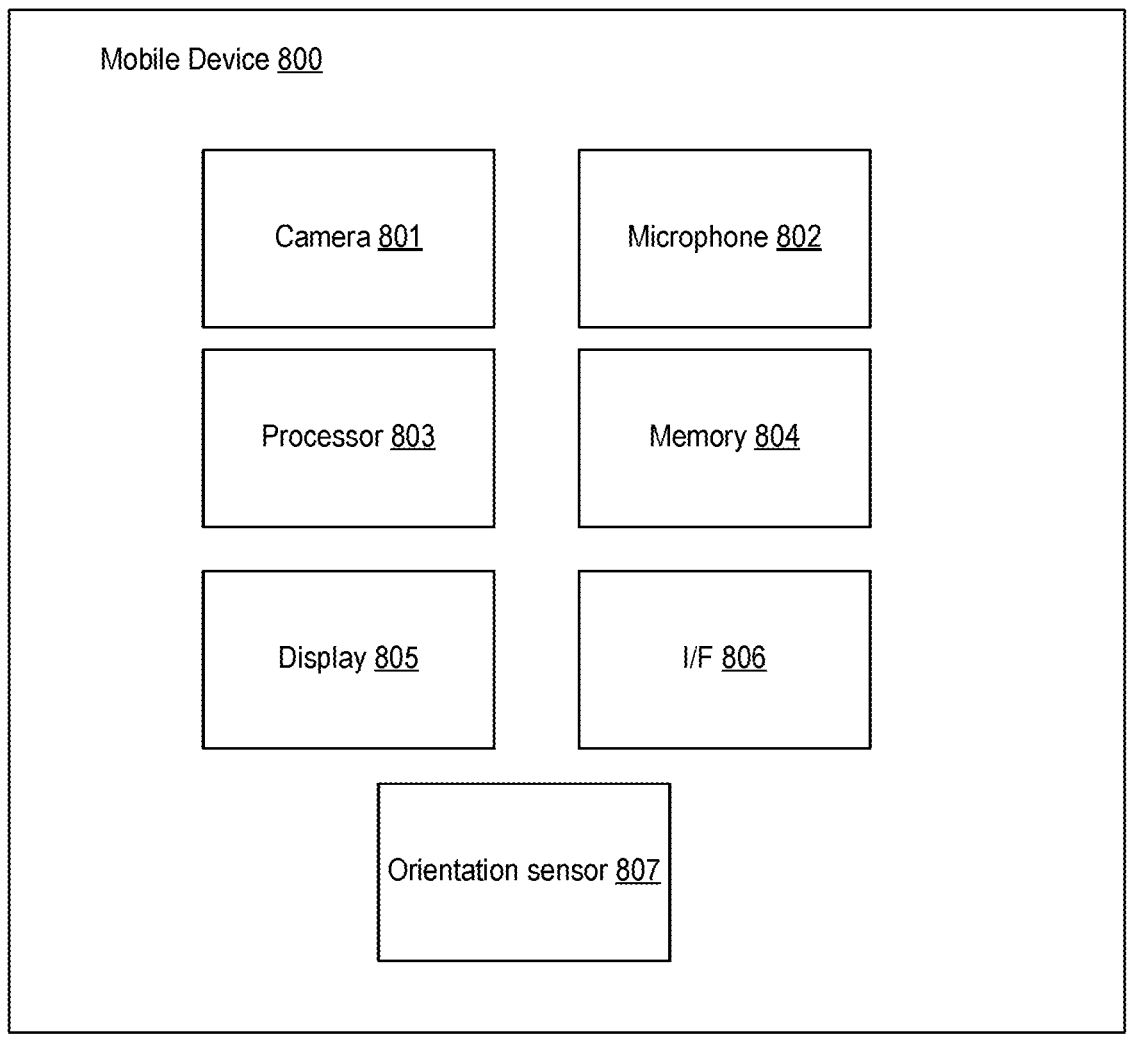
FIG. 8 illustrates an example of a computing device, in accordance with an example implementation.

FIG. 8 illustrates an example of a computing device, in accordance with an example implementation. Computing device can be in the form of a laptop, a personal computer, a mobile device, a tablet, or other devices in accordance with the desired implementation. Computing device 800 can include camera 801, microphone 802, processor 803, memory 804, display 805, interface (I/F) 806 and orientation sensor 807. Camera 801 can include any type of camera that is configured to record any form of video in accordance with the desired implementation. Microphone 802 can involve any form of microphone that is configured to record any form of audio in accordance with the desired implementation. Display 805 can involve a touch screen display configured to receive touch input to facilitate instructions to execute the functions as described herein, or a normal display such as a liquid crystal display (LCD) or any other display in accordance with the desired implementation. I/F 806 can include network interfaces to facilitate connections of the computing device 800 to external elements such as the server and any other device in accordance with the desired implementations. Processor 803 can be in the form of hardware processors such as central processing units (CPUs) or in a combination of hardware and software units in accordance with the desired implementation. The orientation sensor 807 can involve any form of gyroscope and/or accelerometer that is configured to measure any kind of orientation measurement, such as tilt angle, orientation with respect to x,y,z, access, acceleration (e.g., gravity) and so on in accordance with the desired implementation. Orientation sensor measurements can also involve gravity vector measurements to indicate the gravity vector of the device in accordance with the desired implementation. Computing device 800 can be utilized as a device for a local user, or a device for a remote assistant depending on the desired implementation.

In an example implementation, processor(s) 803 are configured to stabilize video received from a first device (e.g., the local user device) for display on a second device (e.g., the remote assistant device); and for input made to a portion of the stabilized video at the second device, generate an augmented reality (AR) overlay on a display of the first device corresponding to the portion of the stabilized video as illustrated, for example, at FIGS. 3-5.

Depending on the desired implementation processor(s) 803 can be configured to stabilize video received from the first device for display on the second device by identifying one or more anchor images in the video; determining an object of interest of a 2D surface based on the identified one or more anchor images; and executing perspective correction on the video based on the object of interest of the 2D surface for display on the second device as described in FIG. 1. As described herein, the object of interest can include a 2D panel surface such as a panel display (e.g., as displayed on a MFD), a keypad, a touch screen, a display screen (e.g., on a computer, mobile device, or other device), and other physical or displayed interfaces in accordance with the desired implementation. Anchor images can include buttons, dials, icons, or other objects expected to be on the panel surface in accordance with the desired implementation.

Depending on the desired implementation, processor(s) 803 can be configured to crop the video to the object of interest for display on the second device, as illustrated in FIG. 4. In such a manner, the video can be cropped so that only the display screen, panel display, or other object of interest is provided to the second device.

Depending on the desired implementation, processor(s) 803 is configured to identify the one or more anchor images in the video by searching a database for the one or more anchor images matching one or more images in the video as described at 101 of FIG. 1. The database can be remotely stored and accessed in a storage system, a server, or otherwise in accordance with the desired implementation. In example implementations, AR overlays can also be stored in the database for retrieval and future replay by the first device.

Processor(s) 803 is configured to identify the one or more anchor images in the video by detecting a quadrangle on the video received from the first device; matching a 3D plane to 2D points of the detected quadrangle; tracking the 3D plane matched to the 2D points of the detected quadrangle; and receiving a selection of the one or more anchor images in the video through the second device as described in FIG. 1. In example implementations, a quadrangle or rectangular detector as is known in the art is utilized as most panels and displayed interfaces tend to be in the form of a quadrangle or rectangle, however, the detector can be modified in accordance with the desired implementation. For example, in example implementations involving circular interfaces, a circular surface detector can be utilized instead. Further, after the quadrangle or rectangle is detected, the 3D plane is mapped to 2D points of the detected quadrangle/rectangle (e.g., mapping to the corners of the rectangle), so that it can be tracked in accordance with any implementation known in the art. Once the panel is detected, the user can then select anchor images (e.g., panel buttons, dials, etc.) which can be incorporated in real time in the AR system.

As illustrated in FIG. 1 to FIG. 6, the AR overlay on the display of the first device corresponding to the portion of the stabilized video can be conducted live in response to the input made to the portion of the stabilized video at the second device to facilitate real time interaction between the remote assistant and the local user. In another example implementation, the generating of the AR overlay can be delayed and asynchronously deployed in accordance with the desired implementation of the remote assistant. The remote assistant can confirm the AR overlay on their own device and then provide instructions (e.g., touching a button for confirmation) to their device to transmit the AR overlay to the local user device for display. In this manner, the remote assistant can make AR annotations or provide other AR overlays and preview them before it is deployed to the local user. In example implementations, the input made to a portion of the stabilized video can include freeform annotations. Further, if the AR overlay involves selection of a particular panel button or moving the cursor to click at a particular portion, the AR overlay can involve an indication for moving a cursor of the first device from a first location to a second location. Such an indication can be implemented in any mariner in accordance with the desired implementation (e.g., via arrows tracing a pathway, via a line, etc.)

As illustrated in FIG. 5, processor(s) 803 can be configured to track one or more of a hand and a finger in the video; and occlude portions of the AR overlay overlapping with the one or more of the hand and the finger on the display of the first device. The hand and/or finger tracking can be implemented through any desired implementation. Through such example implementations, the AR overlays can be presented in a realistic manner one the device of the remote user.

As illustrated in FIG. 7, processor(s) 803 can be configured to stabilize video received from the first device for display on the second device by pausing the video on the display on the second device. In such example implementations, the remote assistant can pause the video stream to make annotations or provide other AR overlays in accordance with the desired implementation. Further, processor(s) 803 can be configured to generate the AR overlay on a display of the first device corresponding to the portion of the stabilized video by, for a pause in the input exceeding a timeout threshold, generating a video clip with the annotations; and providing the video clip on the display of the first device as illustrated at 707, 709 and 711 of FIG. 7. The timeout can be set in accordance with the desired implementation.

Processor(s) 803 can be configured to, for the first device being determined to be set down, replaying the video clip on the display of the first device; and for the first device being determined to be in user hands, providing the video for display to the second device as illustrated at 703, 706, 708, and 710 of FIG. 7.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
stabilizing video received from a first device for display on a second device;
for input made to a portion of the stabilized video at the second device, generating an augmented reality (AR) overlay on a display of the first device corresponding to the portion of the stabilized video, wherein a saved videoclip of the stabilized video contains the AR overlay,
wherein the AR overlay comprises instructions for actions to be performed on the first device, and
wherein stabilizing the video comprises identifying at least one anchor image in the video, determining an object of interest based on the at least one anchor image, and executing perspective correction on the video based on the object of interest.

2. The method of claim 1, further comprising:
displaying the saved videoclip on a third device different from the first device and the second device.

3. The method of claim 2, wherein the second device displays the saved videoclip as the saved videoclip is displayed on the third device.

4. The method of claim 1, further comprising:
previewing the AR overlay before the AR overlay is deployed to the first device.

5. The method of claim 4, wherein the generating the AR overlay on the display of the first device corresponding to the portion of the stabilized video comprises:
generating the AR overlay on the display of the second device in response to the input; and
for receipt of instructions to provide the AR overlay to the first device, transmitting the AR overlay to the first device for display.

6. The method of claim 1, further comprising:
cropping the video to the object of interest for display on the second device.

7. The method of claim 1, wherein the AR overlay further comprises dynamic overlays having a plurality of action steps for the actions to be performed on the first device.

8. A system, comprising:
a first device configured to stabilize video
at least one memory configured to store instructions; and
at least one processor coupled to the memory and configured the execute the instructions to:
stabilize video received from a first device for display on a second device;
for input made to a portion of the stabilized video at the second device, generate an augmented reality (AR) overlay on a display of the first device corresponding to the portion of the stabilized video, wherein a saved videoclip of the stabilized video contains the AR overlay,
wherein the AR overlay comprises instructions for actions to be performed on the first device, and
wherein stabilize the video comprises identify at least one anchor image in the video, determine an object of interest based on the at least one anchor image, and execute perspective correction on the video based on the object of interest.

9. The system of claim 8, wherein the at least one processor is configured to:
display the saved videoclip on a third device different from the first device and the second device.

10. The system of claim 9, wherein the second device displays the saved videoclip as the saved videoclip is displayed on the third device.

11. The system of claim 8, wherein the at least one processor is configured to:
preview the AR overlay before the AR overlay is deployed to the first device.

12. The system of claim 11, wherein to generate the AR overlay on the display of the first device corresponding to the portion of the stabilized video, the at least one processor is configured to:
generate the AR overlay on the display of the second device in response to the input; and
for receipt of instructions to provide the AR overlay to the first device, transmit the AR overlay to the first device for display.

13. The system of claim 8, wherein the at least one processor is configured to:
crop the video to the object of interest for display on the second device.

14. The system of claim 8, wherein the AR overlay further comprises dynamic overlays having a plurality of action steps for the actions to be performed on the first device.

15. An information processing apparatus, comprising:
at least one memory configured to store instructions; and
at least one processor coupled to the memory and configured the execute the instructions to:
stabilize video received from a first device for display on a second device;
for input made to a portion of the stabilized video at the second device, generate an augmented reality (AR) overlay on a display of the first device corresponding to the portion of the stabilized video, wherein a saved videoclip of the stabilized video contains the AR overlay,
wherein the AR overlay comprises instructions for actions to be performed on the first device, and wherein stabilize the video comprises identify at least one anchor image in the video, determine an object of interest based on the at least one anchor image, and execute perspective correction on the video based on the object of interest.

16. The apparatus of claim 15, wherein the at least one processor is configured to:
   display the saved videoclip on a third device different from the first device and the second device.

17. The apparatus of claim 16, wherein the second device displays the saved videoclip as the saved videoclip is displayed on the third device.

18. The apparatus of claim 15, wherein the at least one processor is configured to:
   preview the AR overlay before the AR overlay is deployed to the first device.

19. The apparatus of claim 18, wherein to generate the AR overlay on the display of the first device corresponding to the portion of the stabilized video, the at least one processor is configured to:
   generate the AR overlay on the display of the second device in response to the input; and
   for receipt of instructions to provide the AR overlay to the first device, transmit the AR overlay to the first device for display.

20. The apparatus of claim 15, wherein the at least one processor is configured to:
   crop the video to the object of interest for display on the second device.

21. The apparatus of claim 15, wherein the AR overlay further comprises dynamic overlays having a plurality of action steps for the actions to be performed on the first device.

* * * * *